(12) United States Patent
Abbasfar

(10) Patent No.: US 8,207,892 B2
(45) Date of Patent: Jun. 26, 2012

(54) TECHNIQUE FOR DETERMINING AN ANGLE OF ARRIVAL IN A COMMUNICATION SYSTEM

(75) Inventor: Aliazam Abbasfar, Sunnyvale, CA (US)

(73) Assignee: Rambus Inc., Sunnyvale, CA (US)

(*) Notice: Subject to any disclaimer, the term of this patent is extended or adjusted under 35 U.S.C. 154(b) by 0 days.

(21) Appl. No.: 12/678,463

(22) PCT Filed: Sep. 2, 2008

(86) PCT No.: PCT/US2008/075024
§ 371 (c)(1),
(2), (4) Date: Mar. 16, 2010

(87) PCT Pub. No.: WO2009/058473
PCT Pub. Date: May 7, 2009

(65) Prior Publication Data
US 2010/0259449 A1    Oct. 14, 2010

Related U.S. Application Data

(60) Provisional application No. 60/983,785, filed on Oct. 30, 2007.

(51) Int. Cl.
*G01S 1/14* (2006.01)
(52) U.S. Cl. ...................................................... 342/414
(58) Field of Classification Search .................. 342/414
See application file for complete search history.

(56) References Cited

U.S. PATENT DOCUMENTS

| 3,710,329 | A | * | 1/1973 | Mailloux et al. ............. 342/373 |
| 5,349,364 | A | * | 9/1994 | Bryanos et al. ............. 343/853 |
| 5,682,238 | A | * | 10/1997 | Levitt et al. .................. 356/450 |
| 6,738,020 | B1 | | 5/2004 | Lindskog et al. |
| 6,781,540 | B1 | * | 8/2004 | MacKey et al. ............. 342/25 F |
| 7,054,664 | B2 | * | 5/2006 | Nagaraj ..................... 455/562.1 |
| 2001/0038318 | A1 | * | 11/2001 | Johnson et al. ............. 331/135 |
| 2001/0049295 | A1 | * | 12/2001 | Matsuoka et al. ........... 455/562 |
| 2002/0150070 | A1 | * | 10/2002 | Shattil ........................ 370/342 |

(Continued)

FOREIGN PATENT DOCUMENTS

EP    1229342 A2    8/2002

(Continued)

OTHER PUBLICATIONS

Molishch, Andreas F. et al., "Space-Time-Frequency (STF) Coding for MIMO-OFDM Systems", IEEE Communications Letters, vol. 6, No. 9, Sep. 2002, 3 pages.

(Continued)

*Primary Examiner* — Thomas Tarcza
*Assistant Examiner* — Frank J McGue
(74) *Attorney, Agent, or Firm* — Park, Vaughan, Fleming & Dowler LLP

(57) ABSTRACT

Embodiments of a circuit are described. In this circuit, a transmit circuit provides signals to antenna elements during an acquisition mode, where a given signal to a given antenna element includes at least two frequency components having associated phases, and where the phase of a given frequency component in the given signal is different from phases of the given frequency component for the other antenna elements. Moreover, an output node couples the transmit circuit to the antenna elements that transmit the signals. Note that these signals establish an angle of a communication path between the circuit and another circuit.

24 Claims, 15 Drawing Sheets

U.S. PATENT DOCUMENTS

| | | | |
|---|---|---|---|
| 2003/0149357 A1* | 8/2003 | Liu | 600/437 |
| 2004/0208138 A1* | 10/2004 | Hayashi et al. | 370/286 |
| 2006/0132353 A1* | 6/2006 | Natsume et al. | 342/147 |
| 2006/0246863 A1* | 11/2006 | Reed | 455/276.1 |
| 2009/0273510 A1* | 11/2009 | Tillotson | 342/26 B |

FOREIGN PATENT DOCUMENTS

| | | | |
|---|---|---|---|
| EP | 1267501 | A2 | 12/2002 |
| EP | 1267501 | A3 | 11/2003 |
| EP | 1717969 | A2 | 4/2006 |
| WO | 0143309 | A2 | 6/2001 |
| WO | 0143309 | A3 | 6/2001 |

OTHER PUBLICATIONS

EP Office Action dated Feb. 24, 2012 re EP Application No. 08843973.2, 4 pages.

* cited by examiner

```
                                                    ┌─ 800
┌─────────────────────────────────────────────────────────┐
│ GENERATE SIGNALS TO BE TRANSMITTED BY ANTENNA ELEMENTS  │
│ DURING AN ACQUISITION MODE, WHERE A GIVEN SIGNAL TO A   │
│ GIVEN ANTENNA ELEMENT INCLUDES AT LEAST TWO FREQUENCY   │
│ COMPONENTS HAVING ASSOCIATED PHASES, WHEREIN THE PHASE  │
│ OF A GIVEN FREQUENCY COMPONENT IN THE GIVEN SIGNAL IS   │
│ DIFFERENT FROM PHASES OF THE GIVEN FREQUENCY COMPONENT  │
│ FOR THE OTHER ANTENNA ELEMENTS, AND WHERE THE SIGNALS   │
│ ESTABLISH AN ANGLE OF A COMMUNICATION PATH BETWEEN A    │
│ DEVICE AND ANOTHER DEVICE                               │
│                          810                            │
└─────────────────────────────────────────────────────────┘
                              │
                              ▼
┌─────────────────────────────────────────────────────────┐
│ TRANSMIT SIGNALS FROM THE DEVICE TO THE OTHER DEVICE    │
│ USING THE ANTENNA ELEMENTS                              │
│                          812                            │
└─────────────────────────────────────────────────────────┘
```

FIG. 8

┌─────────────────────────────────────────────────────────────────────┐
│ RECEIVE SIGNALS USING AT LEAST ONE ANTENNA AT ANOTHER DEVICE
│ DURING AN ACQUISITION MODE, WHERE THE RECEIVED SIGNALS INCLUDE
│ MULTIPLE INSTANCES OF AT LEAST TWO FREQUENCY COMPONENTS, AND
│ WHERE A GIVEN INSTANCE OF A GIVEN FREQUENCY COMPONENT HAS A
│ PHASE THAT IS DIFFERENT FROM THE PHASES OF THE OTHER INSTANCES OF
│ THE GIVEN FREQUENCY COMPONENT
│ 910

↓

DETERMINE AN ANGLE OF ARRIVAL OF THE RECEIVED SIGNALS BASED ON
THE PRESENCE OF A PEAK IN A SPECTRUM CORRESPONDING TO THE
RECEIVED SIGNALS, WHERE THE ANGLE OF ARRIVAL IS AN ANGLE OF A
COMMUNICATION PATH BETWEEN THE DEVICE AND THE OTHER DEVICE
912

FIG. 9

TECHNIQUE FOR DETERMINING AN ANGLE OF ARRIVAL IN A COMMUNICATION SYSTEM

TECHNICAL FIELD

The present embodiments relate to techniques for communicating information. More specifically, the present embodiments relate to circuits and methods for determining an angle associated with a communication path in a wireless communication system.

BRIEF DESCRIPTION OF THE FIGURES

FIG. 8 is a flow chart illustrating an embodiment of a process for transmitting signals.

FIG. 9 is a flow chart illustrating an embodiment of a process for receiving signals.

Figure 1A:
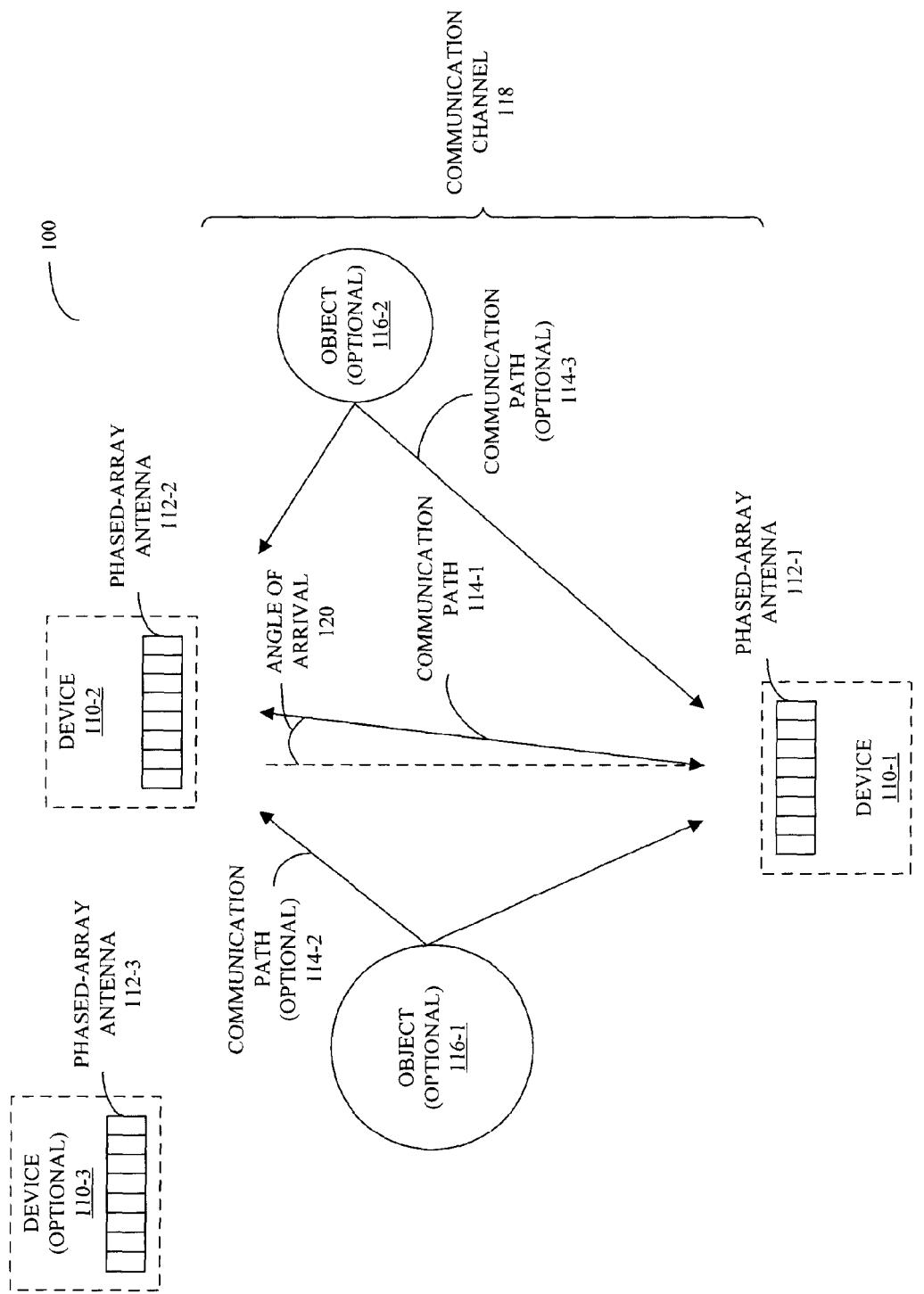
FIG. 1A is a block diagram illustrating an embodiment of a communication system.

Table 1 provides an illustration of multiple frequency components for use in determining an angle of arrival.

Note that like reference numerals refer to corresponding parts throughout the drawings.

DETAILED DESCRIPTION

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present description. Thus, the present description is not intended to be limited to the embodiments shown, but is to be accorded the widest scope consistent with the principles and features disclosed herein.

Embodiments of a circuit, an integrated circuit that includes the circuit, and techniques for communicating signals between devices in a communication system are described. These circuits, integrated circuits, and techniques may be used to rapidly characterize one or more communication paths in the communication system by broadcasting one or more signals or beacons. This signal includes multiple instances of at least two frequency components, where a given instance of a given frequency component has a phase that is different from the phases of the other instances of the given frequency component. Moreover, the signal facilitates fast determination of an angle of arrival of the signal at given receiver in the communication system. In particular, the location of a peak (such as the maximum) in a frequency spectrum associated with the signal corresponds to the angle of arrival.

In some embodiments of the circuit, a first transmit circuit provides signals to antenna elements during an acquisition mode, where a given signal to a given antenna element includes at least two frequency components having associated phases, and where the phase of a given frequency component in the given signal is different from phases of the given frequency component for the other antenna elements. Moreover, a first output node couples the first transmit circuit to antenna elements that transmit the signals. Note that these signals establish an angle of a communication path between the circuit and another circuit.

In some embodiments, the circuit includes antennas that include the antenna elements and/or a phase-arrayed antenna that includes the antenna elements.

In some embodiments, the signals are transmitted concurrently. Moreover, transmissions from the given antenna element may be omni-directional.

In some embodiments, the given signal includes multiple frequency components, each of which has a different associated phase, where the phases associated with a given frequency component in signals for the other antenna elements are different than the phase of the given frequency component in the given signal.

In some embodiments, the signals are encoded using orthogonal frequency-division multiplexing (OFDM). Moreover, the given frequency component may be associated with a sub-channel in a communication channel between the circuit and other circuit.

In some embodiments, the communication path is a line-of-sight communication path.

In some embodiments, the angle is established prior to synchronization of communication between the circuit and the other circuit.

In some embodiments, the circuit includes a first input node coupled to a first antenna element, which receives additional signals from the other circuit. Note that the first antenna element can be one of the antenna elements. Moreover, a first receiver circuit is coupled to the first input node, where the first receiver circuit detects the additional signals, and where the additional signals include feedback from the other circuit that specifies the angle. Additionally, the circuit includes control logic to adjust a transmission angle of subsequent signals transmitted using the antenna elements based on the angle.

In some embodiments, amplitudes of the frequency components in the signals for the antenna elements are different from each other.

Another embodiment provides the other circuit and another integrated circuit that includes the other circuit. In this other circuit, a second input node is coupled to a second antenna element, which receives signals during the acquisition mode from the circuit. Note that the received signals include multiple instances of at least two frequency components, where a given instance of a given frequency component has a phase that is different from the phases of the other instances of the given frequency component. Moreover, a second receiver circuit detects the received signals and determines the angle of arrival of the received signals based on the presence of a peak in a spectrum of the received signals.

In some embodiments, the angle of arrival is the angle of the communication path between the circuit and the other circuit. Note that the communication path may be the only communication path between the circuit and the other circuit.

In some embodiments, the other circuit includes an antenna that includes at least the second antenna element and/or a phase-arrayed antenna including at least the second antenna element.

In some embodiments, the received signals include multiple instances of multiple frequency components, where, for a given frequency component, each instance has a different associated phase than the phases associated with the other instances.

In some embodiments, the received signals are encoded using OFDM. Moreover, the frequency component may be associated with the sub-channel in the communication channel between the circuit and the other circuit.

In some embodiments, a second transmit circuit transmits the additional signals to the circuit, where the additional signals include information associated with the angle of arrival. Moreover, a second output node is coupled to the second transmit circuit and is coupled to at least a third antenna element that transmits the additional signals, where at least the third antenna element can be at least the second antenna element.

In some embodiments, the angle of arrival corresponds to a shift in the peak relative to a central frequency of a spectrum associated with the received signals. Note that determining the angle of arrival may involve calculating the spectrum.

Moreover, the peak in the spectrum may be determined using one or more filters. Additionally, the presence of multiple peaks in the spectrum may indicate the presence of one or more multi-path signals in the received signals.

Another embodiment provides a system that includes a device and another device. The device includes the circuit and the other device includes the other circuit. Moreover, the other device receives the signals and provides the additional signals to the device.

Another embodiment provides a method for transmitting signals, which may be performed by the device. During operation, the device generates signals to be transmitted by antenna elements during the acquisition mode, where a given signal to a given antenna element includes at least two frequency components having associated phases, and where the phase of a given frequency component in the given signal is different from phases of the given frequency component for the other antenna elements. Next, the device transmits the signals to the other device using the antenna elements. Note that the signals establish the angle of the communication path between the device and the other device.

Another embodiment provides a method for receiving signals, which may be performed by the other device. During operation, the other device receives signals using at least the second antenna during the acquisition mode, where the received signals include multiple instances of at least two frequency components, and where a given instance of a given frequency component has a phase that is different from the phases of the other instances of the given frequency component. Next, the other device determines the angle of arrival of the received signals based on the presence of a peak in a spectrum corresponding to the received signals, where the angle of arrival is the angle of a communication path between the device and the other device.

The aforementioned embodiments may be used in a wide variety of applications, including: serial or parallel wireless links, wireless metropolitan area networks (such as WiMax), wireless local area networks (WLANs), wireless personal area networks (WPANs), and systems and devices that include one or more antennas or antenna elements. For example, the embodiments may be used in conjunction with ultra-wide-band (UWB) communication and/or a communication standard associated with the Multi-Band OFDM Alliance (MBOA). Additionally, the aforementioned embodiments may be used in: desktop or laptop computers, hand-held or portable devices (such as personal digital assistants and/or cellular telephones), set-top boxes, home networks, and/or video-game devices.

We now describe embodiments of circuits, wireless communication devices and systems that include these circuits or devices, and communication technique for use in the devices and systems. Many wireless communication systems use one or more narrow beams to communicate information between devices. However, prior to communicating with each other, the devices need to find these narrow beams. Unfortunately, this can be a time-consuming process. In the discussion that follows, a special signal or beacon is broadcast by a transmitter in a wireless communication system during an acquisition mode. This signal facilitates fast determination of an angle of arrival of the signal at one or more receivers in the wireless communication system, and thus, fast determination of the angle of a communication path between the transmitter and a given one of these receivers. Note that this technique may be used in point-to-point and point-to-multi-point communication systems.

FIG. 1A presents a block diagram illustrating a communication system 100. In this system, device 110-1 communicates information with device 110-2 via a communication channel 118 using wireless communication. Moreover, communication between the devices 110 may be concurrent or serial. Note that in some embodiments, device 110-1 communicates information with one or more additional devices, such as optional device 110-3. In the discussion that follows, communication between device 110-1 and device 110-2 is used as an illustrative example.

In some embodiments, communication between the devices 110 may be simultaneous (i.e., full duplex communication in which at least a pair of the devices 110 may transmit and receive information at the same time) or the communication direction may alternate (i.e., half-duplex communication in which, at a given time, one device transmits information and another device receives information).

Device 110-1 may include or may be coupled to antenna circuitry, such as phased-array antenna 112-1, to generate and/or receive signals and device 110-2 may include or may be coupled to antenna circuitry, such as phased-array antenna 112-2, to generate and/or receive signals. In an exemplary embodiment, the phased-array antennas 112 include microstripline elements that are configured to output and/or receive signals in a 7 GHz frequency band centered on 60 GHz (or on a frequency between 50 and 90 GHz). These phased-array antennas may transmit and receive shaped beams. For example, the shaped beams may have a beam width of 15-25°.

Note that phased-array antennas 112 may facilitate communication of information between the devices 110 using signals modulated onto high carrier frequencies (such as 60 GHz), or in communication systems in which the transmission power is restricted (such as less than 10 mW) and the communication may be over distances on the order of 10 m. In particular, signals transmitted by one of the devices 110 may reflect off of optional objects 116 in proximity to the devices 110. Note that multi-path communication (and multi-path signals) may be associated with scattering off of the optional objects 116.

Consequently, communication between the devices 110 may occur via direct (line-of-sight) or indirect (also referred to as multi-path or non-line-of-sight) communication paths 114 (which may include line-of-sight or near line-of-sight communication). For example, the communication paths 114 may include: direct communication path 114-1, as well as optional indirect communication paths 114-2 and/or 114-3. However, in some embodiments there may only be one communication path, such as communication path 114-1, between a given pair of devices, such as devices 110-1 and 110-2. In the discussion that follows, characterization of an angle of arrival 120 of the signals associated with the direct communication path 114-1 at device 110-2 is used as an illustrative example.

In particular, phase relationships between multiple frequency components in one or more signals received from device 110-1 may facilitate determination of the angle of arrival 120, and thus, the angle associated with communication path 114-1. For example, as discussed further below with reference to FIGS. 6-7, the location of a peak in the frequency domain or in a frequency spectrum associated with the one or more signals may correspond to the angle of arrival 120.

Consequently, device 110-1 may transmit the one or more signals, and device 110-2 may receive these signals and may use them to determine the angle of arrival 120. Next, device 110-2 may provide feedback information to device 110-1 about the angle of arrival 120, and device 110-1 may use this information to adjust a transmission angle of shaped beams or antenna patterns to improve communication with device 110-2.

Note that the one or more signals may be transmitted concurrently from device 110-1 to one or more of the other devices 110 and/or the one or more signals may be omni-directional. These attributes may facilitate fast determination of the angle of arrival 120, and thus, fast determination of the angle associated with the primary communication path (which is the communication path that offers the best performance), such as communication path 114-1. Moreover, the angle of arrival 120 may be determined prior to time synchronization between devices 110 during an acquisition mode. Note that in some embodiments, the one or more signals are transmitted and received during the acquisition mode. However, in other embodiments the one or more signals are transmitted and received during a normal-operation mode.

Moreover, during the communication between the devices 110 in either the acquisition mode or the normal-operation mode, device 110-2 may provide feedback to device 110-1 by characterizing the performance (which is also referred to as signal condition) associated with the communication path 114-1. For example, the characterization may include: determining or measuring: a signal strength (such as a signal amplitude or a signal intensity), a mean-square error (MSE) relative to a target (such as a threshold, a point in a constellation diagram, and/or a sequence of points in a constellation diagram), a signal-to-noise ratio (SNR), a bit-error rate (BER), a timing margin, and/or a voltage margin. In some embodiments, the characterization of the communication path 114-1 is performed continuously, after a time interval has elapsed since a previous characterization of the communication path, and/or as needed.

Note that the communication of data, feedback information, and/or control information may use in-band or out-of-band signaling (relative to the range of frequencies and/or bands of frequencies used in the communication path 114-1). Moreover, in some embodiments communication of feedback information and/or control information between the devices 110 may occur via a separate link, such as a wireless link that has a lower data rate than the data rate of the communication path 114-1 and/or using a different carrier frequency or modulation technique than the one or more carrier frequencies of the signals on the communication path 114-1. For example, this link may include a WLAN (such as IEEE 802.11 or Bluetooth®).

In some embodiments, the communication path 114-1 includes multiple sub-channels. Signals carried on these sub-channels may be time-multiplexed, frequency-multiplexed, and/or encoded. Thus, in some embodiments communication of information on the communication channel 118 uses: time-division multiple access (TDMA), frequency-division multiple access (FDMA), and/or code-division multiple access (CDMA).

In some embodiments, signals on the communication path 114-1 use discrete multi-tone communication (such as orthogonal frequency-division multiplexing or OFDM), which includes multiple sub-channels. A range of frequencies, a frequency band, or groups of frequency bands may be associated with a given sub-channel or frequency band. Frequency bands for adjacent sub-channels may partially or completely overlap, or may not overlap. For example, there may be partial overlap of neighboring frequency bands, which occurs in so-called approximate bit loading. Moreover, signals on adjacent sub-channels may be orthogonal.

In some embodiments a variety of techniques are used to restore or recover the communication path 114-1 if there is a loss of signal condition. For example, signals on the communication path 114-1 may be static or may be dynamically configured. Thus, one or more of the sub-channels in the communication path 114-1 may be adjusted when there is a loss or degradation of signal condition. For example, the number of sub-channels may be changed, or the data rate may be modified.

In some embodiments, an auto-negotiation technique is used between the devices 110 in an attempt to restore or recover the communication path 114-1. During this auto-negotiation technique, device 110-2 may provide feedback to device 110-1 on the efficacy of any changes to the signals on communication path 114-1 (henceforth referred to as remedial action). Based on this feedback, device 110-1 may further modify the transmitted signals and may try to re-establish or maintain communication on communication path 114-1. Note that the remedial action may include: re-transmitting previous data; transmitting previous or new data (henceforth referred to as data) using a greater transmission power than the transmission power used in a previous transmission; reducing the data rate relative to the data rate used in a previous transmission; transmitting data with reduced intersymbol interference (for example, with blank intervals inserted before and/or after the data); transmitting data at a single clock edge (as opposed to dual-data-rate transmission); transmitting data with at least a portion of the data including an error-correction code (ECC) or an error-detection code (EDC); transmitting data using a different encoding or modulation code than the encoding used in a previous transmission; transmitting data after a pre-determined idle time; transmitting data to a different receiver in device 110-2; and/or transmitting data to another device, such as device 110-3, which may attempt to forward the data to device 110-2.

Note that at least a portion of the ECC and/or the EDC data may be dynamically generated (i.e., in real time) and/or may be previously generated (i.e., pre-existing). In some embodiments, the ECC includes a Bose-Chaudhuri-Hochquenghem (BCH) code, which is a sub-class of cyclic codes. In exemplary embodiments, the ECC and/or the EDC data includes: a cyclic redundancy code (CRC), a parity code, a Hamming code, a Reed-Solomon code, and/or another error checking and correction code.

In some embodiments, communication between the devices 110 occurs using multiple communication paths 114. For example, one or both of the devices 110 may select a primary communication path, such as communication path 114-1, based on the signal condition. If this primary communication path is subsequently degraded or disrupted, an alternate communication path may be used (i.e., the devices 110 may switch to the alternate communication path). This alternate communication path may be pre-determined by the devices 110 or may be identified by one or both of the devices 110 if the primary communication path is degraded or disrupted. Note that the use of an alternate communication path may supplement or may be used independently of the previously described remedial action.

Note that communication system 100 may include fewer components or additional components. Moreover, two or more components may be combined into a single component, and the position of one or more components may be changed. For example, one or more of the devices 110 may select the communication path 114-1, at least in part, based on information associated with a positioning system (such as a local, differential, and/or global positioning system). This technique may allow the devices 110 to adapt when there is relative motion of the devices 110. Thus, device 110-1 may adapt one or more shaped beams based on information about the relative motion. Alternatively, the information associated with the positioning system may alert device 110-1 to the presence of another proximate device, such as the device 110-2.

Figure 1B:
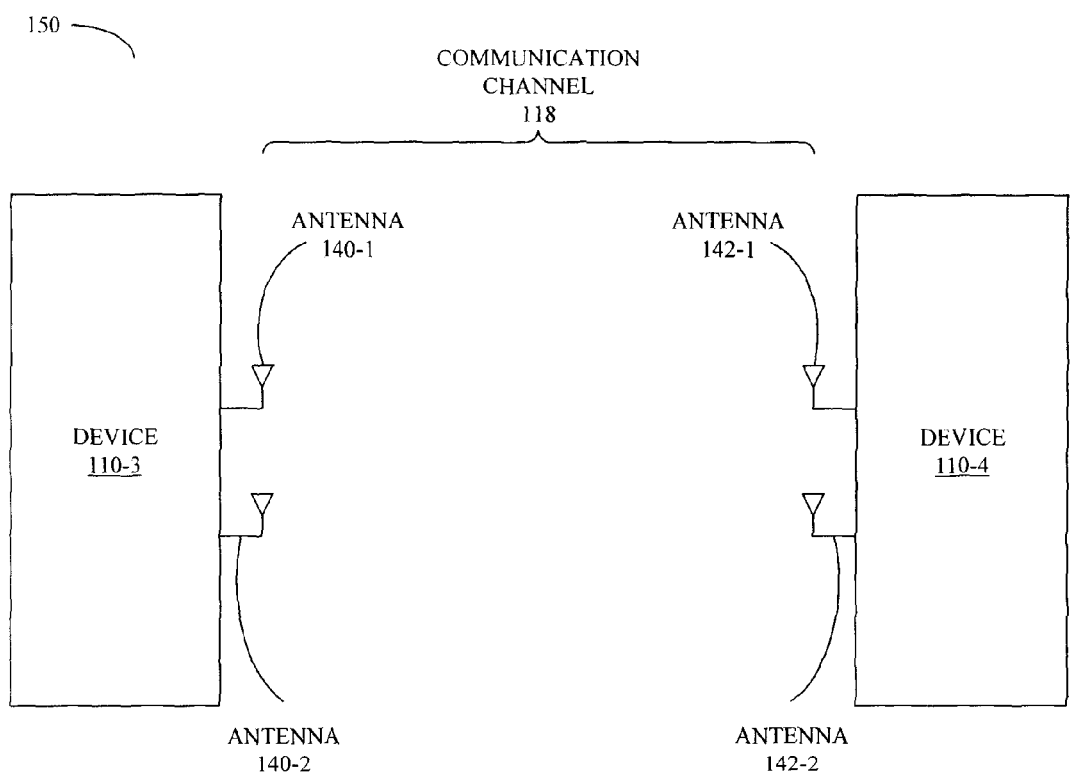
FIG. 1B is a block diagram illustrating an embodiment of a communication system.

In some embodiments, antenna elements in phased-array antennas 112 are included in separate antennas. This is shown in FIG. 1B, which presents a block diagram illustrating an embodiment of a communication system 150. In this system, device 110-3 may include or may be coupled to antenna circuitry, such as antennas 140 (each of which includes one or more antenna elements), to generate and/or receive signals. Moreover, device 110-4 may include or may be coupled to antenna circuitry, such as antennas 142 (each of which includes one or more antenna elements), to generate and/or receive signals.

Figure 2A:
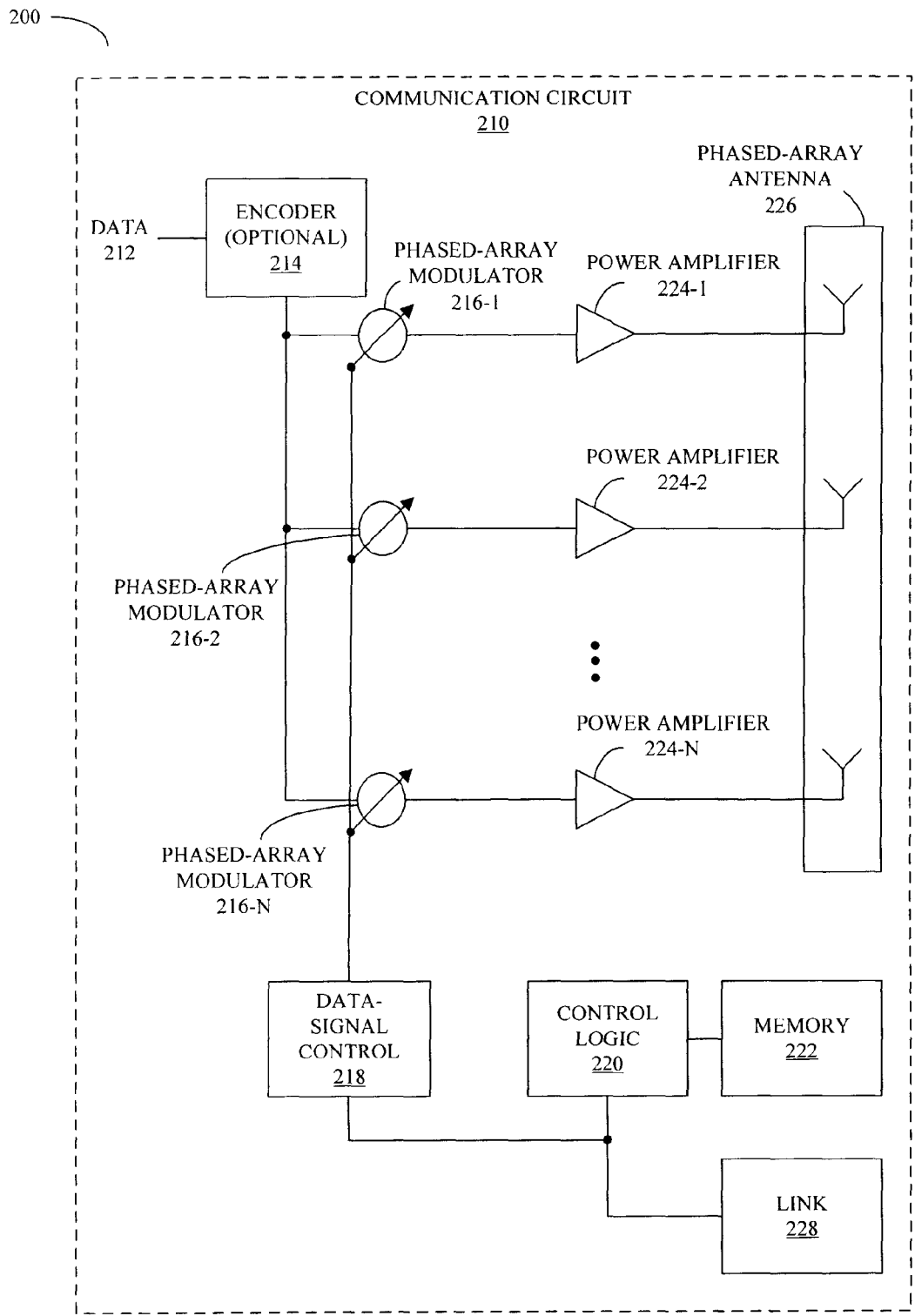
FIG. 2A is a block diagram illustrating an embodiment of a communication circuit.

We now describe communication circuits that may be used in one or more of the devices 110. FIG. 2A presents a block diagram illustrating an embodiment 200 of a communication circuit 210, which may constitute a transmit circuit. This communication circuit may be used to generate and/or to provide electrical signals corresponding to the one or more signals that facilitate determination of the angle of arrival 120 (FIG. 1A), and may be used to transmit these electrical signals. While the one or more signals may be transmitted during the normal-operation mode, in the discussion that follows transmission of the one or more signals during the acquisition mode is used as an illustrative example.

During the acquisition mode, data x(n) 212 associated with the one or more electrical signals is received. Alternatively, at least a portion of the data x(n) 212 is stored in memory 222. Data x(n) 212 may be encoded in optional encoder 214 and/or may be at least partially encoded or modulated prior to being sent to the communication circuit 210. This coding should be understood to include modulation coding and/or spread-spectrum encoding, for example: coding based on binary pseudo-random sequences (such as maximal length sequences or m-sequences); Gold codes; and/or Kasami sequences.

Figure 3A:
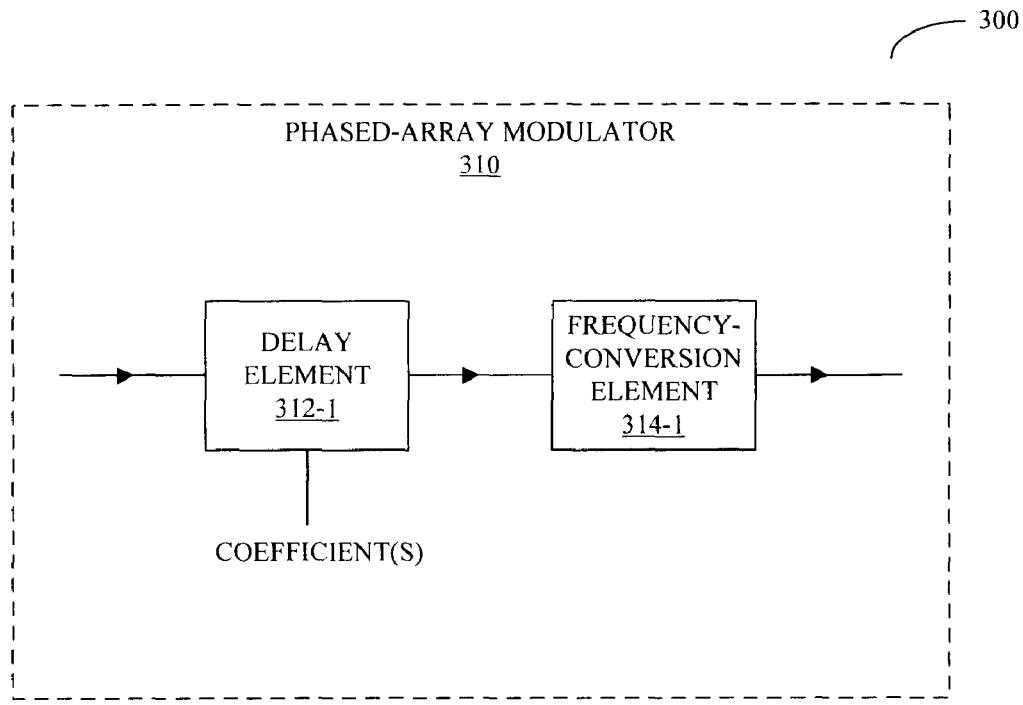
FIG. 3A is a block diagram illustrating an embodiment of a phased-array modulator.
Figure 3B:
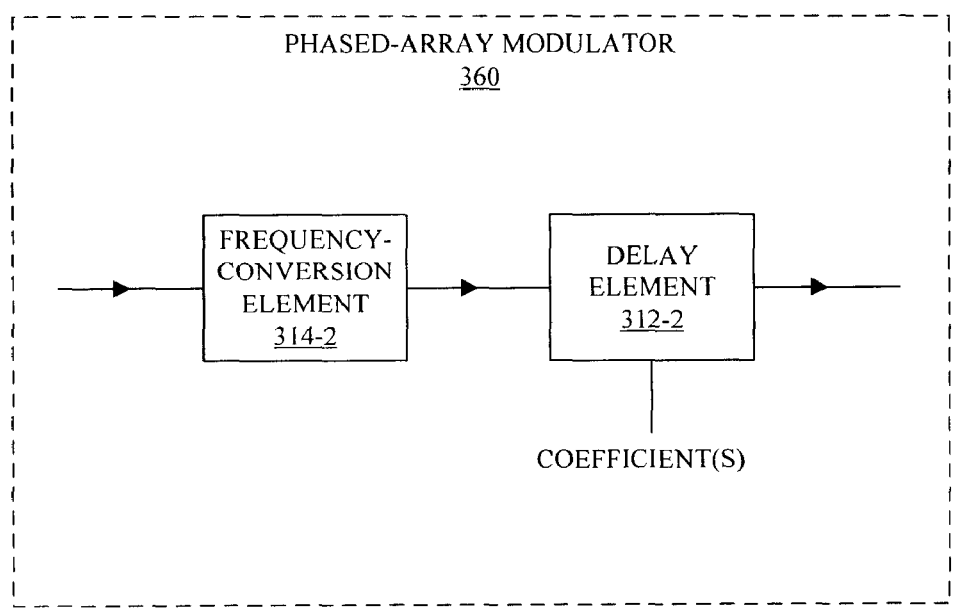
FIG. 3B is a block diagram illustrating an embodiment of a phased-array modulator.

In particular, after modulation coding, phases of two or more frequency components in a given electrical signal to a given antenna element in phased-array antenna 226 may be set. For example, based on a look-up table in memory 222, control logic 220 may instruct data-signal control 218 to set these phases using one of phased-array modulators 216. FIG. 3A presents a block diagram illustrating an embodiment 300 of a phased-array modulator 310. This phased-array modulator includes a delay element 312-1 (that provides an adjustable delay based on one of the coefficients provided by data-signal control 218 in FIG. 2A) and a frequency-conversion element 314-1, such as a mixer or a heterodyne mixer. Note that in general the coefficients are different for the different frequency components in the given electrical signal. Moreover, as shown in FIG. 3B, which presents a block diagram illustrating an embodiment 350 of a phased-array modulator 360, frequency-conversion element 314-2 may precede delay element 312-2.

Referring back to FIG. 2A, note that the phase of a given frequency component in the given signal is different from phases of the given frequency component in the electrical signals for the other antenna elements in phased-array antenna 226. (In general, the phases of the frequency components in the given signal are also different from each other.) Note that some or all of the phases of the frequency components in the electrical signals for the antenna elements may be set concurrently.

In general, the angular resolution of the determined angle of arrival 120 (FIG. 1A) is improved as the number of frequency components in the electrical signals is increased and/or as the number of antenna elements is increased. In an exemplary embodiment, seven frequency components are used in the electrical signals to each of four antenna elements in phased-array antenna 226. Moreover, these electrical signals may be encoded using OFDM. For example, the given frequency component may be associated with a given sub-channel in a communication channel, such as the communication channel 118 (FIGS. 1A and 1B), between device 110-1 and 110-2 (FIGS. 1A and 1B).

After modulation, one or more power amplifiers, such as amplifiers 224, may amplify the electrical signals. In some embodiments, amplifiers 224 have variable or adjustable gain. Consequently, in some embodiments the amplitudes of two or more frequency components in the given electrical signal are different from each other.

Before, during or after this amplification, the modulated electrical signals may be converted to analog electrical signals using a digital-to-analog converter (DAC) and RF up-converted to one or more appropriate frequency bands using one or more carrier frequencies $f_i$ associated with one or more sub-channels. For example, the up-conversion may use frequency-conversion elements, such as one or more heterodyne mixers or modulators (as illustrated in FIGS. 3A and 3B).

Then, signals corresponding to the electrical signals may be transmitted by the antenna elements in the phased-array antenna 226. Note that these signals may be omni-directional and/or may be associated with a range of directions or angles (such as when shaped beams or directional antennas are used during transmission).

Figure 2B:
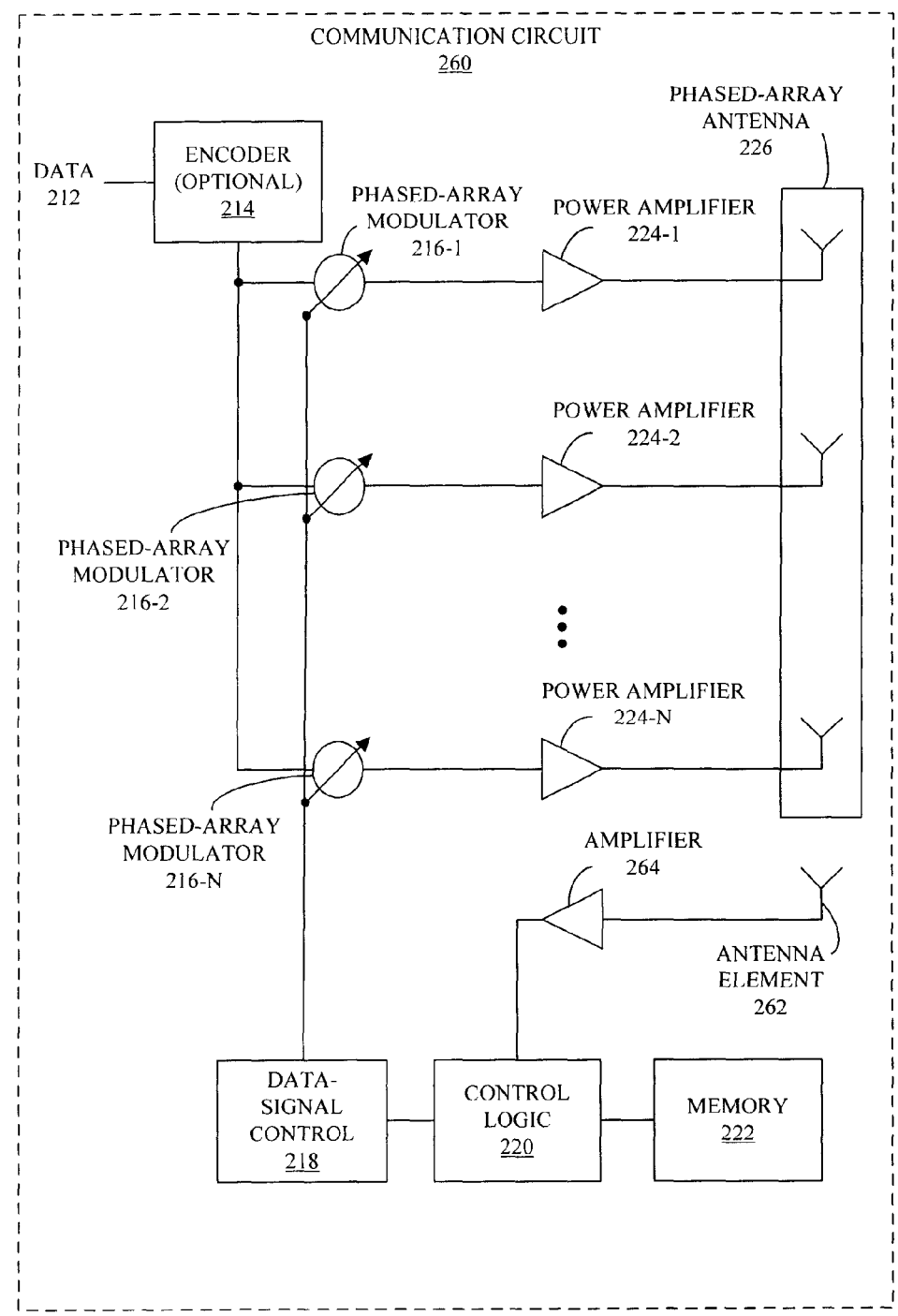
FIG. 2B is a block diagram illustrating an embodiment of a communication circuit.

As described previously, the signals transmitted by communication circuit 210 may be received by another circuit, such as that in device 110-2 (FIG. 1A), which then determines the angle of arrival 120 (FIG. 1A) from these signals. (Note that receiver circuits are described further below with references to FIGS. 4-5.) Then, this information may be feed back to communication circuit 210. For example, the feedback information may be received using link 228. Alternatively, as shown in FIG. 2B, which presents a block diagram illustrating an embodiment 250 of a communication circuit 260, the feedback information may be received using at least one antenna element 262 and a receiver, such as amplifier 264. In some embodiments, antenna element 262 is included in the phased-array antenna 226.

Based on this feedback information, communication circuit 210 may modify the transmission angle of the transmitted signals. For example, during the acquisition mode, communication circuit 210 may switch from transmitting omni-directional signals to shaped beams by changing the relative phases set by phased-array modulators 216. In some embodiments, once the angle associated with the communication path 114-1 (FIG. 1A) has been determined, time synchronization between devices 110-1 and 110-2 (FIG. 1A) may be performed. Moreover, in some embodiments the same signals that were used to determine the angle may be used to time synchronize the devices 110-1 and 110-2 (FIG. 1A).

Note that after acquisition is completed (the angle has been determined and the devices have been time synchronized), the angle may be used during directional communication of data between devices 110-1 and 110-2 (FIG. 1A) in the normal-operation mode. For example, beam forming techniques may be used to provide a directional antenna pattern and/or one or more shaped beams.

In some embodiments, antenna elements and/or one or more antennas, such as phased-array antenna 226, may be: external to the communication circuits 210 and 260 (FIG. 2B), on-chip, on the package or chip carrier, and/or on another integrated circuit (for example, in a chip stack). Moreover, in some embodiments, at least some of the signals transmitted by different antennas and/or antenna elements are distinguished from each other based on: encoding (such as TDMA, FDMA, and/or CDMA), spatial diversity (such as multiple-input multiple-output communication), and/or polarization diversity (e.g., there may be different polarizations of at least some of the signals transmitted by different antennas and/or antenna elements).

Figure 4A:
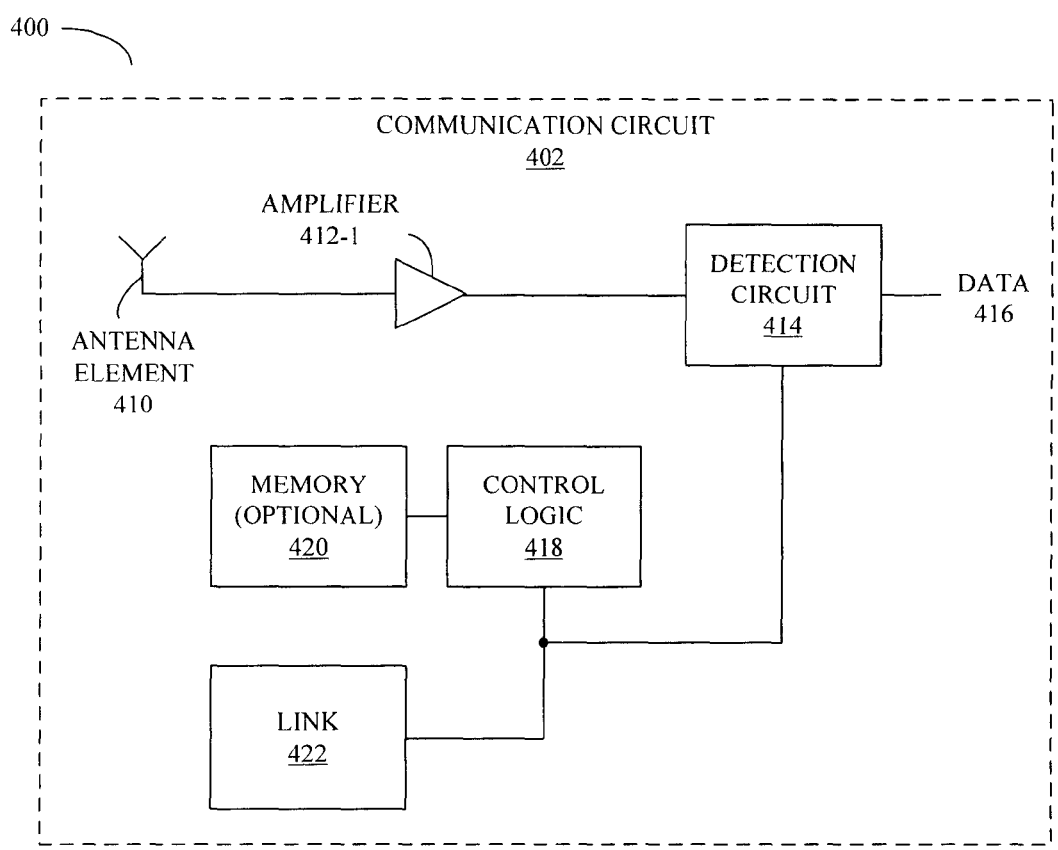
FIG. 4A is a block diagram illustrating an embodiment of a communication circuit.

Signals transmitted by communication circuits 210 and 260 (FIG. 2B) may combine (by linear superposition) in the communication channel 118 (FIGS. 1A and 1B). As shown in FIG. 4A, which presents a block diagram illustrating an embodiment 400 of a communication circuit 402 (which may constitute a receiver circuit), these signals may be: received; and the angle of arrival of these signals may be determined; and this information may be fed back to communication circuits 210 (FIG. 2A) and/or 260 (FIG. 2B).

In particular, the signals are received using one or more antennas (such as antenna 410) and/or antenna elements. Note that the antennas and/or antenna elements may be: external to the communication circuit 402, on-chip, on the package or chip carrier, and/or on another integrated circuit (for example, in a chip stack).

As noted previously, the received signals include multiple instances of at least two frequency components, where a given instance of a given frequency component has a phase that is different from the phases of the other instances of the given frequency component. Moreover, as discussed further below with reference to FIGS. 6-7, these frequency components and the associated phases results in a peak in the frequency domain or a frequency spectrum associated with the received signals, which corresponds to the angle of arrival 120 (FIG. 1A) of the received signals.

Consequently, after amplification in amplifier 412-1 (which may have a variable gain or a fixed gain), detection circuit 414 may determine the angle of arrival 120 (FIG. 1A) during the acquisition mode (and, more generally, data x(n) 416 during the normal-operation mode). In particular, detection circuit 414 may determine the location of a peak in the frequency domain or in the frequency spectrum associated with the received signals.

In addition, the detection circuit 414 may perform: baseband demodulation (for example, using a Fast Fourier Transform or FFT), equalization (such as linear or non-linear equalization), data-symbol detection (using slicers and/or sequence detection), and baseband decoding. For example, the baseband decoding may include symbol-to-bit encoding that is the opposite or the inverse of a bit-to-symbol encoding performed prior to transmitting the signals. In some embodiments, communication circuit 402 implements error detection and/or correction. For example, errors may be detected by performing a multi-bit XOR operation in conjunction with one or more parity bits in the transmitted signals.

Before, during or after the amplification by the amplifier 412-1, the received signals may be converted to digital electrical signals using an analog-to-digital converter (ADC) and RF down-converted to baseband from one or more appropriate frequency bands using one or more carrier frequencies $f_i$ associated with one or more sub-channels. For example, the down-conversion may use frequency-conversion elements, such as one or more heterodyne mixers or modulators. Moreover, in some embodiments the amplifier 412-1 may adjust the gain in the communication circuit 402, for example, based on an automatic gain control (AGC) loop.

Next, control logic 418 either stores this angle-of-arrival information in optional memory 420 (for subsequent use), or feeds it back to communication circuit 210 (FIG. 2A) using link 422. More generally, communication circuit 402 may provide feedback to communication circuits 210 (FIG. 2A) and/or 260 (FIG. 2B), and this feedback may be based on the characterization of the performance, i.e., a performance metric, such as the signal condition, of the communication channel 118 (FIGS. 1A and 1B).

Figure 4B:
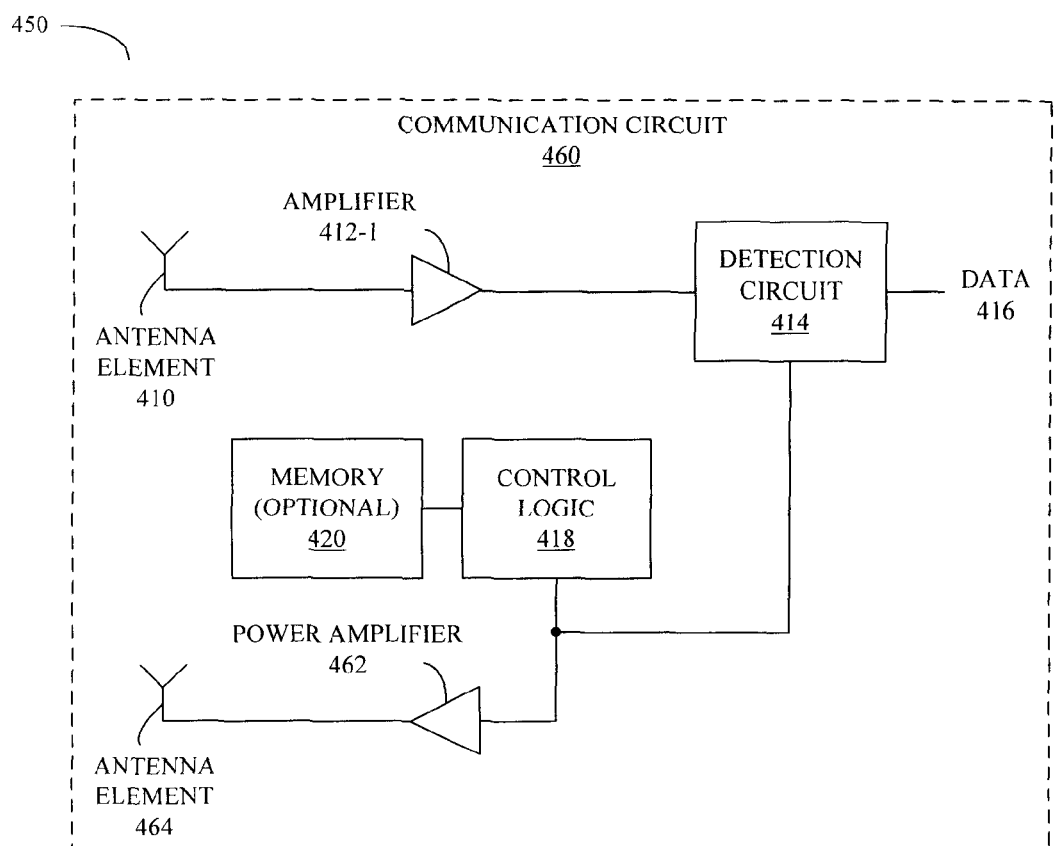
FIG. 4B is a block diagram illustrating an embodiment of a communication circuit.

Alternatively, as shown in FIG. 4B, which presents a block diagram illustrating an embodiment 450 of communication circuit 460, a power amplifier 462 may feed back the information about the angle of arrival 120 (FIG. 1A) using antenna element 464. In some embodiments, antenna element 410 is used to transmit the feedback information.

Note that the angle of arrival 120 (FIG. 1A) may be determined once, after a time interval (such as that associated with a block of data), and/or as needed (such as when there is a degradation in the signal condition that cannot be suitably restored using one or more remedial actions). For example, the angle of arrival 120 (FIG. 1A) may be determined during normal operation and/or during an acquisition mode of operation.

Figure 5A:
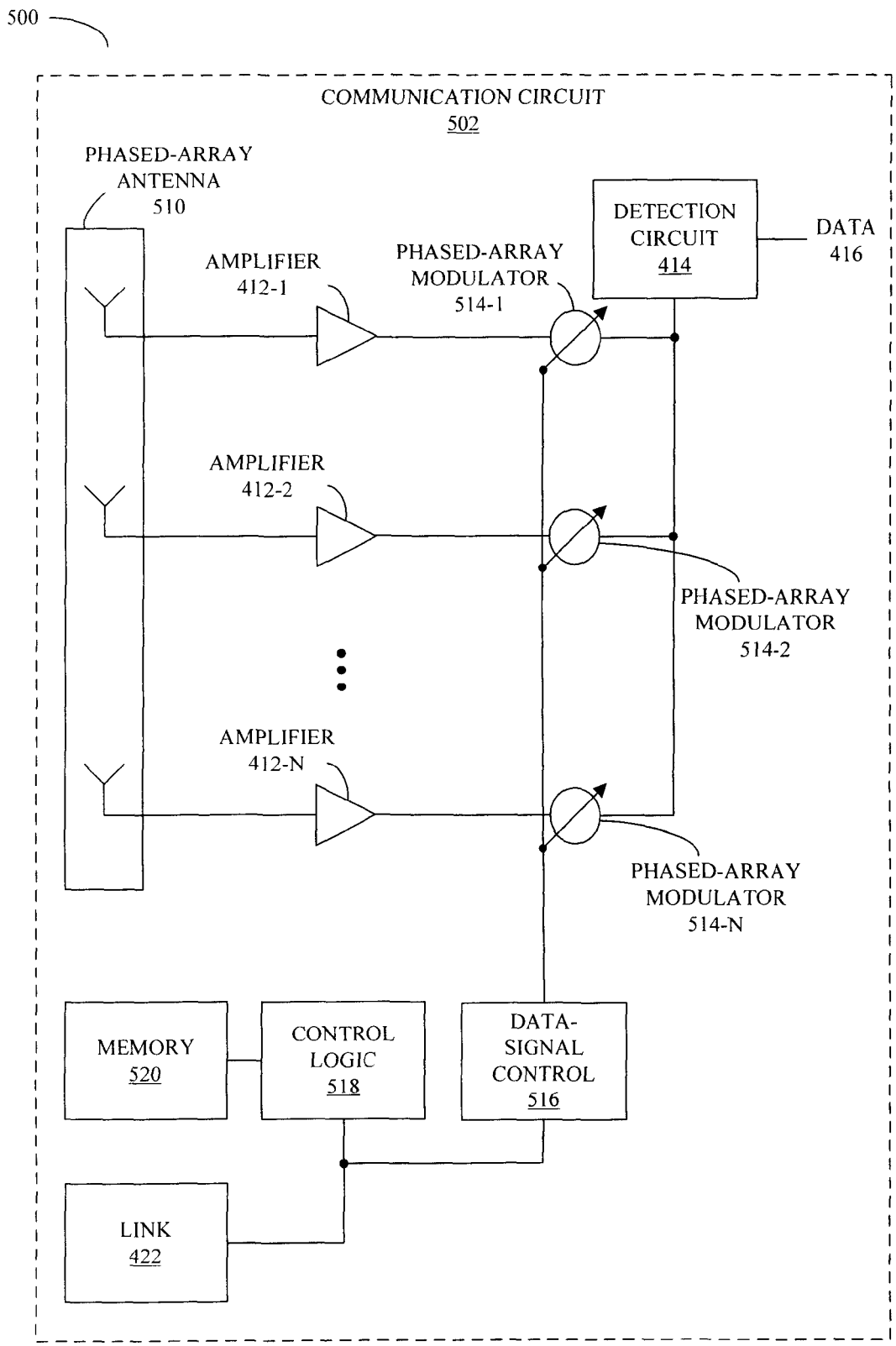
FIG. 5A is a block diagram illustrating an embodiment of a communication circuit.

In some embodiments, the signals are received using one or more antenna elements in a phased-array antenna. This is shown in FIG. 5A, which presents a block diagram illustrating an embodiment 500 of a communication circuit 502. In particular, the signals are received using one or more antenna elements in phased-array antenna 510 and the resulting electrical signals are amplified using one or more amplifiers 412. Based on coefficients stored in memory 520 (such as in a look-up table), control logic 518 may instruct data-signal control 516 to adjust the relative phases of these electrical signals using phase-array modulators 514.

Next, detection circuit 414 may determine the angle of arrival 120 (FIG. 1A) during the acquisition mode (and, more generally, data x(n) 416 during the normal-operation mode). Control logic 518 either stores this angle-of-arrival information in memory 520 (for subsequent use), or feeds it back to communication circuit 210 (FIG. 2A) using link 422.

Figure 5B:
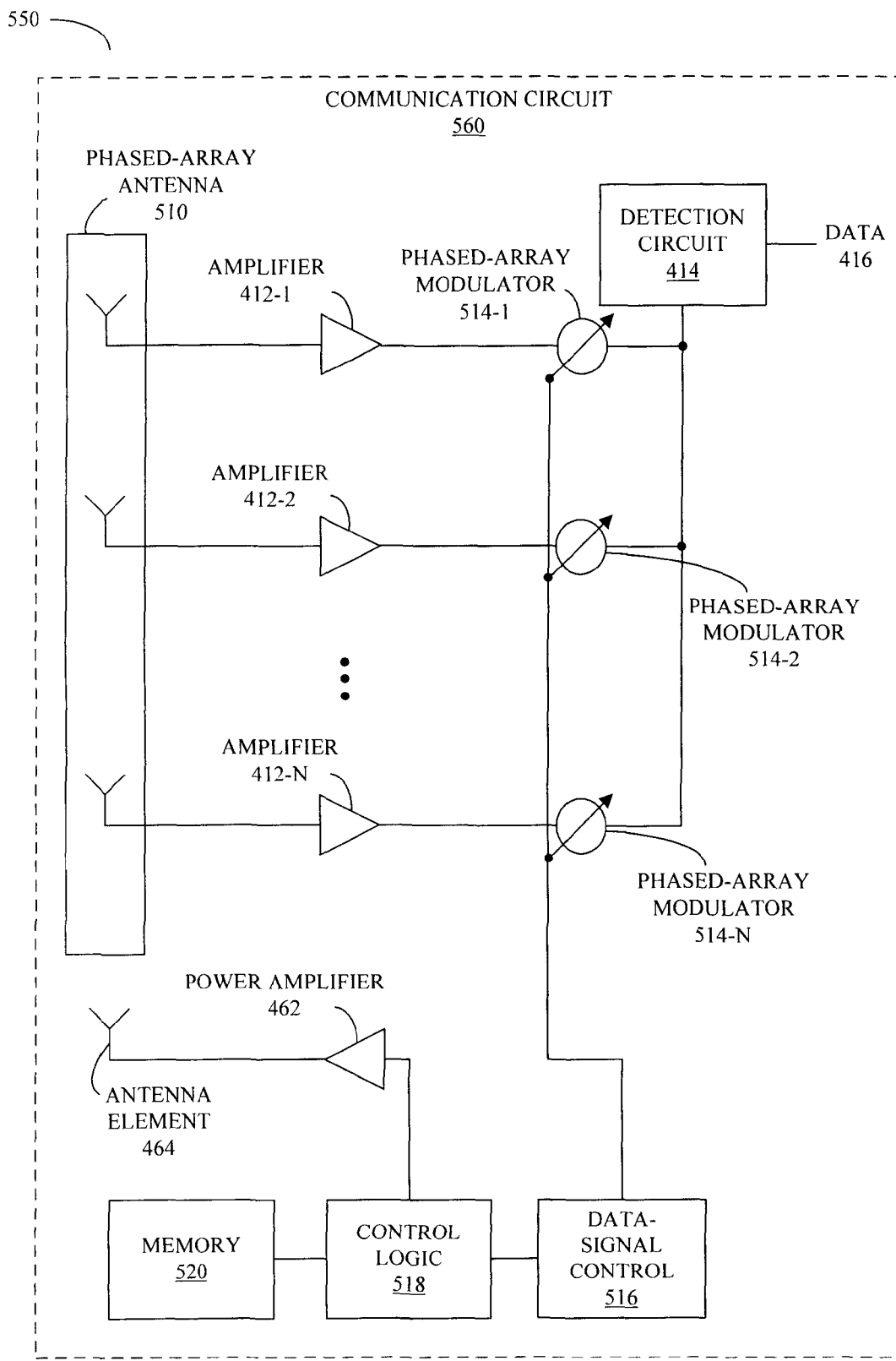
FIG. 5B is a block diagram illustrating an embodiment of a communication circuit.

Alternatively, as shown in FIG. 5B, which presents a block diagram illustrating an embodiment 550 of communication circuit 560, power amplifier 462 may feed back the information about the angle of arrival 120 (FIG. 1A) using antenna element 464. In some embodiments, one or more antenna elements in phased-array antenna 510 are used to transmit the feedback information.

Note that communication circuits 210 (FIG. 2A), 260 (FIG. 2B), 402 (FIG. 4A), 460 (FIG. 4B), 502 (FIG. 5A), and/or 560 may include fewer components or additional components. For example, there may be additional antennas (or antenna elements) and/or the signal lines that couple components to each other may indicate multiple signal lines (or a bus). In some embodiments, communication circuits 210 (FIG. 2A) and/or 260 (FIG. 2B) include pre-emphasis to compensate for losses and/or dispersion associated with the communication channel 118 (FIGS. 1A and 1B). Similarly, in some embodiments communication circuits 402 (FIG. 4A), 460 (FIG. 4B), 502 (FIG. 5A), and/or 560 include equalization. Note that pre-emphasis and/or equalization may be implemented using feed-forward filters and/or decision-feedback-equalization circuits.

Moreover, while not explicitly shown in communication circuits 210 (FIG. 2A), 260 (FIG. 2B), 402 (FIG. 4A), 460 (FIG. 4B), 502 (FIG. 5A), and/or 560, these circuits may include memory buffers for the electrical signals. In addition, clocking circuits are not explicitly illustrated in communication circuits 210 (FIG. 2A), 260 (FIG. 2B), 402 (FIG. 4A), 460 (FIG. 4B), 502 (FIG. 5A), and/or 560. Nonetheless, electrical signals may be transmitted and/or received based on either or both edges in one or more clock signals. Note that in some embodiments transmitting and receiving may be synchronous and/or asynchronous.

Components and/or functionality illustrated in communication circuits 210 (FIG. 2A), 260 (FIG. 2B), 402 (FIG. 4A), 460 (FIG. 4B), 502 (FIG. 5A), and/or 560 may be implemented using analog circuits and/or digital circuits. Furthermore, components and/or functionality in these communication circuits may be implemented using hardware and/or software. In some embodiments, control logic 220 (FIGS. 2A and 2B), 418 (FIGS. 4A and 4B), and/or 518 (FIGS. 5A and 5B) operate on physical-layer structures (such as an RF front-end) in these communication circuits without using information from baseband-processing components.

Note that two or more components in communication circuits 210 (FIG. 2A), 260 (FIG. 2B), 402 (FIG. 4A), 460 (FIG. 4B), 502 (FIG. 5A), and/or 560 may be combined into a single component and/or the position of one or more components may be changed. In some embodiments, communication circuits 210 (FIG. 2A), 260 (FIG. 2B), 402 (FIG. 4A), 460 (FIG. 4B), 502 (FIG. 5A), and/or 560 are included in one or more integrated circuits on one or more semiconductor die.

As noted previously, the one or more signals transmitted by device 110-1 (FIG. 1) during the acquisition mode may have a different frequency spectrum when received in different directions at device 110-2 (FIG. 1A). In particular, a shift in the location (relative to a central frequency) of the maximum or global peak in the frequency spectrum associated with the received signals may correspond to the angle of arrival 120 (FIG. 1A). Consequently, the location of this peak in the frequency domain or in the frequency spectrum associated with the received signals may be used to determine the angle of arrival 120 (FIG. 1A) and, thus, the angle of communication path 114-1 (FIG. 1A).

In some embodiments, the angle of arrival 120 (FIG. 1A) is determined (for example, by detection circuit 414 in FIGS. 4-5) by: calculating the FFT of the one or more received signals; using a series of narrow-band or notch filters to determine the location of the peak; and/or using a mixer, frequency synthesizer and a notch filter to determine the location of the peak. Note that the location of the peak may be determined using a spectral power measurement or calculation, which may be performed prior to time synchronization or locking of the devices 110 (FIGS. 1A and 1B). Thus, the spectral power measurement or calculation may be performed without demodulating the received signals.

Figure 6A:
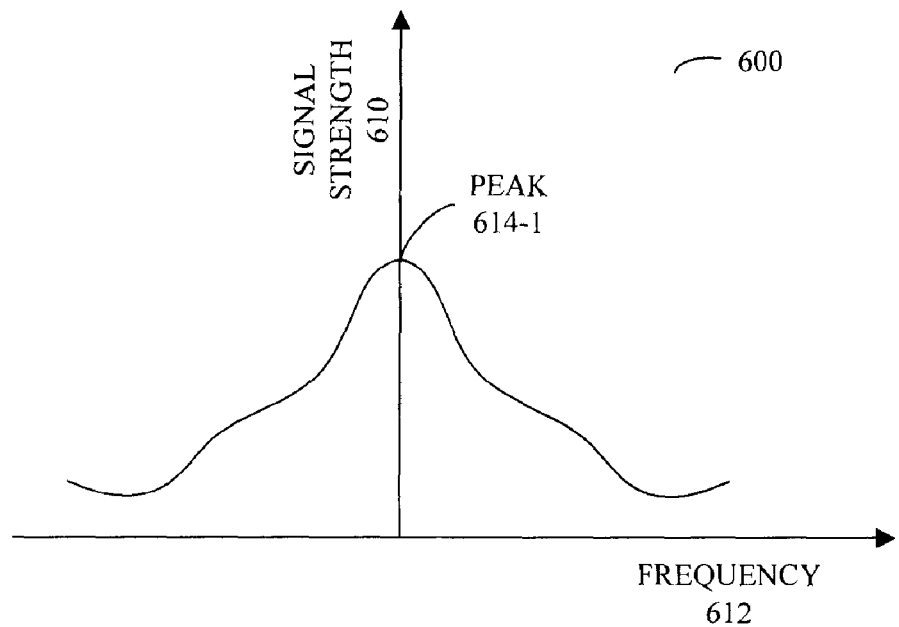
FIG. 6A is a graph illustrating an example of a frequency spectrum.

FIG. 6A presents a graph 600 illustrating a frequency spectrum, plotted as signal strength 610 as a function of frequency 612. This frequency spectrum is associated with signals received at an angle of arrival of zero degrees. Consequently, peak 614-1 is at the central frequency of the frequency spectrum.

Figure 6B:
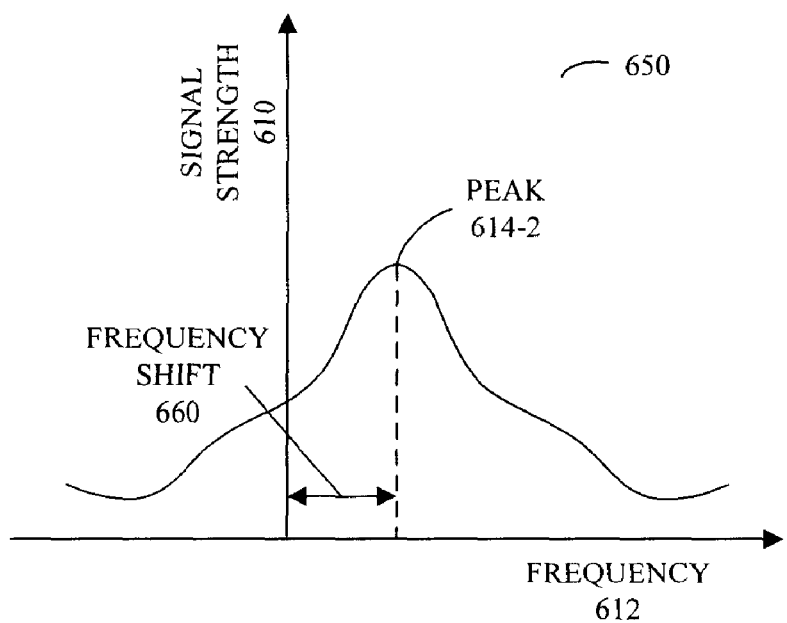
FIG. 6B is a graph illustrating an example of a frequency spectrum.

In contrast, FIG. 6B presents a graph 650 illustrating a frequency spectrum associated with signals received at non-zero angle of arrival. Consequently, peak 614-2 is not at the central frequency of the frequency spectrum; in particular, there is a frequency shift 660.

As illustrated below with reference to FIGS. 7A and 7B, in general the frequency spectrum associated with the signals received for a given angle of arrival has a smooth curve around the maximum or global peak. Note that the presence of multiple local extrema, such as local peaks, may indicate the presence of one or more multi-path signals in the received signals. In this case, the angle of arrival 120 (FIG. 1A) may be determined using a sequential approach, such as a systematic search (for example, by quadrants).

Figure 7A:
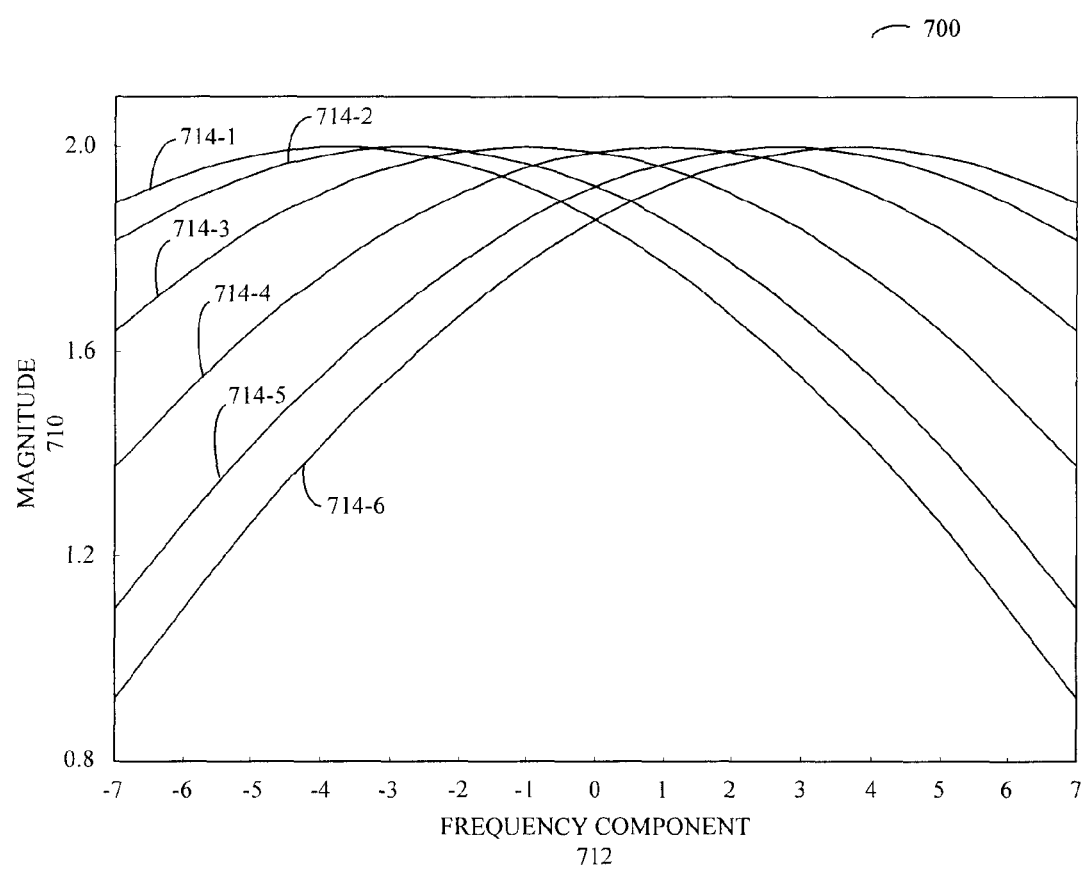
FIG. 7A is a graph illustrating examples of frequency spectra associated with different angles of arrival.
Figure 7B:
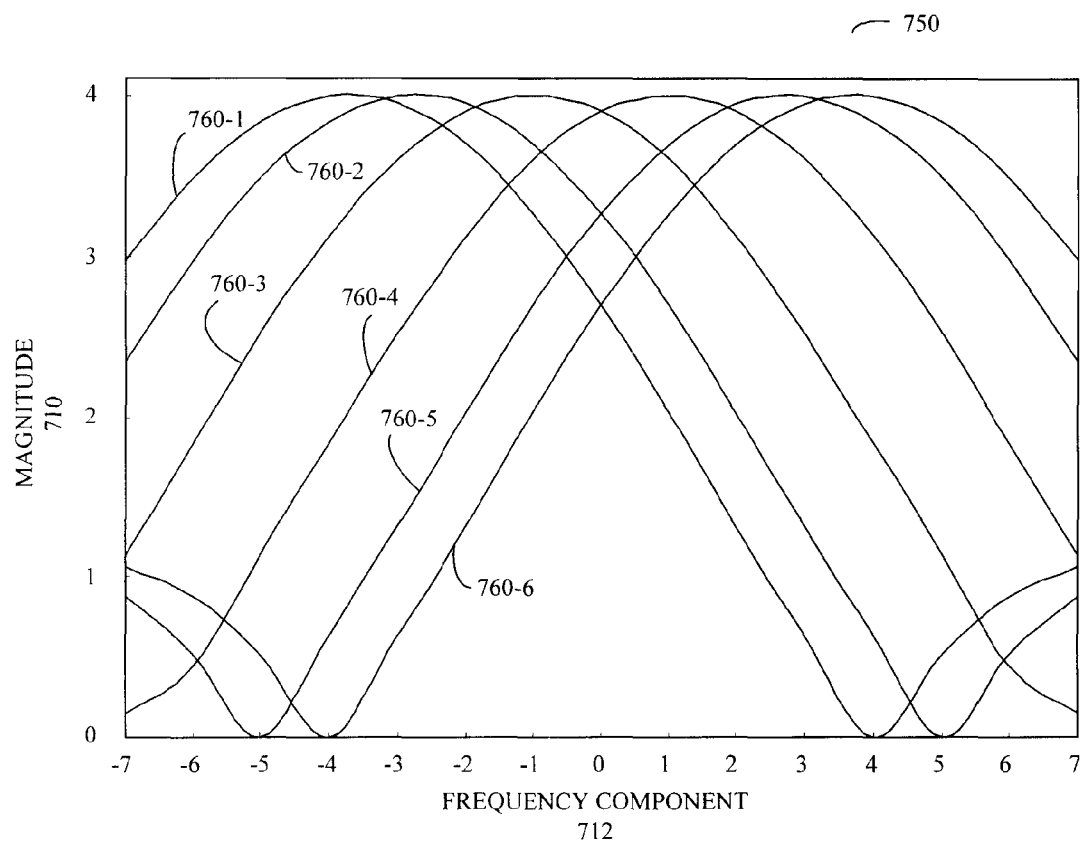
FIG. 7B is a graph illustrating examples of frequency spectra associated with different angles of arrival.

FIG. 7A presents a graph 700 illustrating frequency spectra associated with different angles of arrival 714, plotted as magnitude 710 as a function of frequency tone or frequency component 712. Note that the angles of arrival 714 range from −75° (714-1) to 75° (714-6) in 30° increments. Moreover, note that these frequency spectra correspond to signals that include seven frequency components that are transmitted using two antenna elements or antennas.

As noted previously, the angular resolution is improved as the number of antenna elements is increased. This is shown in FIG. 7B, which presents a graph 750 illustrating frequency spectra associated with different angles of arrival 760, plotted as magnitude 710 as a function of frequency tone or frequency component 712. Note that the angles of arrival 760 range from −75° (760-1) to 75° (760-6) in 30° increments. Moreover, note that these frequency spectra correspond to signals that include seven frequency components that are transmitted using four antenna elements or antennas. Table 1 provides an illustration of the multiple frequency components and the associated phases in the transmitted signals that give rise to the frequency spectra in graph 750.

TABLE 1

| Frequency Component | Antenna Element 1 | Antenna Element 2 | Antenna Element 3 | Antenna Element 4 |
|---|---|---|---|---|
| −3 | 0 | −3φ | −6φ | −9φ |
| −2 | 0 | −2φ | −4φ | −6φ |
| −1 | 0 | −φ | −2φ | −3φ |
| 0 | 0 | 0 | 0 | 0 |
| 1 | 0 | φ | 2φ | 3φ |

TABLE 1-continued

| Frequency Component | Antenna Element 1 | Antenna Element 2 | Antenna Element 3 | Antenna Element 4 |
|---|---|---|---|---|
| 2 | 0 | 2φ | 4φ | 6φ |
| 3 | 0 | 3φ | 6φ | 9φ |

In general, the given electrical signal for the given transmitter antenna element or antenna can be expressed as a superposition of several frequency components or sinusoids (tones) having pre-determined phases (or an equivalent delay), i.e., as $$\sum_n A_n \sin(n\omega_n t + \varphi_n),$$

where $A_n$ is the amplitude, n is an integer, $\omega_n$ is the frequency component and $\phi_n$ is the associated, pre-determined phase. In some embodiments, the amplitudes $A_n$ are the same for the different frequency components. As illustrated in Table 1, one of the antenna elements or antennas may be used as a reference when determining the phases of the frequency components for the other antenna elements or antennas.

As noted previously, at a receiver the peak in the frequency spectrum indicates the angle which is the best angle of arrival 120 (FIG. 1A). For example, if the angle of arrival is 0°, frequency component (or tone) 0 has the maximum power (relative to the other frequency components) because the other sinusoids from the different antenna elements do not arrive in-phase. Similarly, if the angle of arrival is P, such that the phase difference between signals coming from two transmitting antennas or antenna elements that are separated by a distance t and that are a distance d away is 0, because 2td sin(P)/P equals 0, then frequency component 1 has the maximum power and other frequency components will have less power.

We now describe embodiments of a process for communicating data. FIG. 8 presents a flow chart illustrating an embodiment of a process 800 for transmitting signals, which may be performed by a device (such as one of the devices 110 in FIGS. 1A and 1B). During operation, the device generates signals to be transmitted by antenna elements during an acquisition mode (810), where a given signal to a given antenna element includes at least two frequency components having associated phases, wherein the phase of a given frequency component in the given signal is different from phases of the given frequency component for the other antenna elements, and where the signals establish an angle of a communication path between the device and another device. Next, the device transmits signals to the other device using the antenna elements (812).

FIG. 9 presents a flow chart illustrating an embodiment of a process 900 for receiving signals, which may be performed by the other device (such as one of the devices 110 in FIGS. 1A and 1B). During operation, this other device receives signals using at least one antenna during the acquisition mode (910), where the received signals include multiple instances of at least two frequency components, and where a given instance of a given frequency component has a phase that is different from the phases of the other instances of the given frequency component. Next, the other device determines an angle of arrival of the received signals based on the presence of a peak in a spectrum corresponding to the received signals (912), where the angle of arrival is the angle of the communication path between the device and the other device.

Note that in some embodiments there may be additional or fewer operations in process 800 (FIG. 8) and/or process 900. Moreover, the order of the operations may be changed, and two or more operations may be combined into a single operation.

Devices and circuits described herein may be implemented using computer-aided design tools available in the art, and embodied by computer-readable files containing software descriptions of such circuits. These software descriptions may be: at behavioral, register transfer, logic component, transistor and layout geometry-level descriptions. Moreover, the software descriptions may be stored on storage media or communicated by carrier waves.

Data formats in which such descriptions may be implemented include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Moreover, data transfers of such files on machine-readable media including carrier waves may be done electronically over diverse media on the Internet or, for example, via email. Note that physical files may be implemented on machine-readable media such as: 4 mm magnetic tape, 8 mm magnetic tape, 3½ inch floppy media, CDs, DVDs, and so on.

Figure 10:
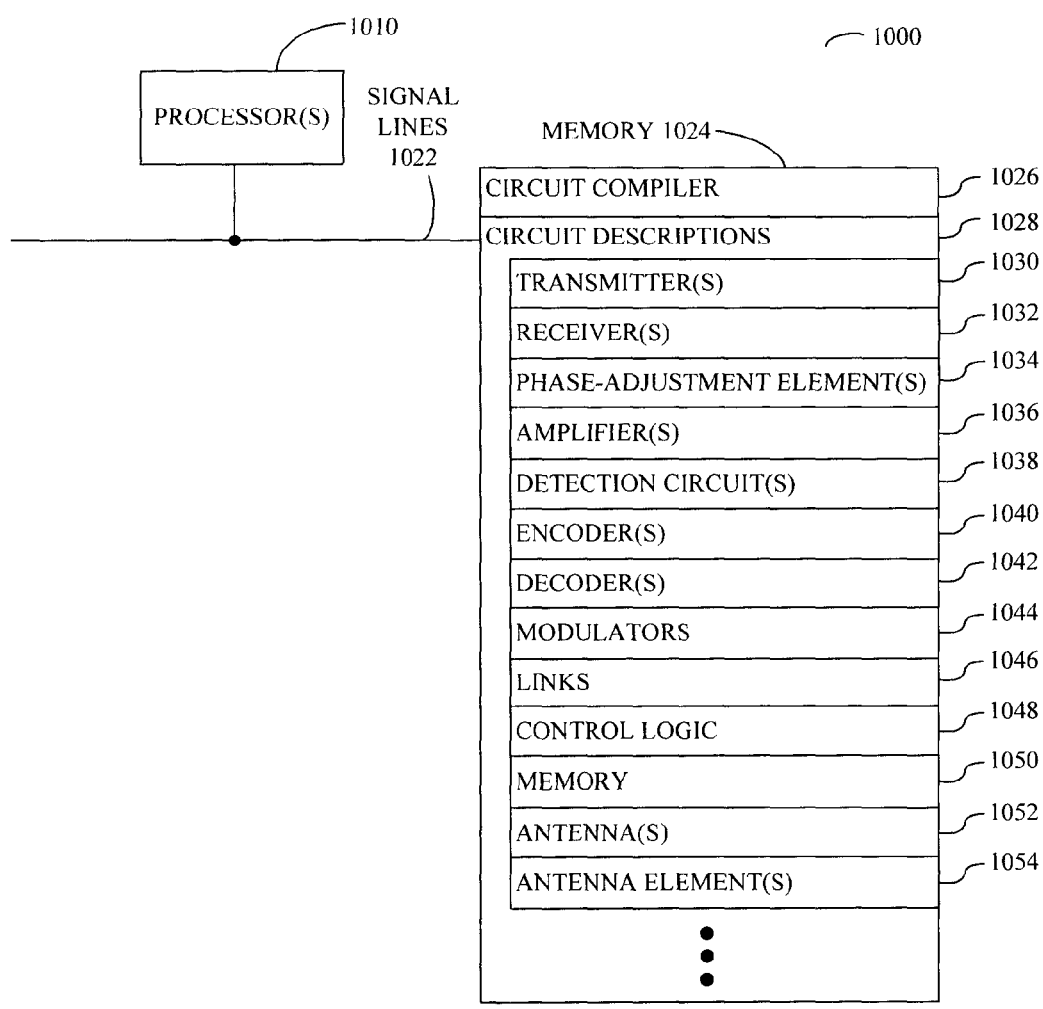
FIG. 10 is a block diagram illustrating an embodiment of a system.

FIG. 10 presents a block diagram illustrating an embodiment of a system 1000 that stores such computer-readable files. This system may include at least one data processor or central processing unit (CPU) 1010, memory 1024 and one or more signal lines or communication busses 1022 for coupling these components to one another. Memory 1024 may include high-speed random access memory and/or non-volatile memory, such as: ROM, RAM, EPROM, EEPROM, Flash, one or more smart cards, one or more magnetic disc storage devices, and/or one or more optical storage devices.

Memory 1024 may store a circuit compiler 1026 and circuit descriptions 1028. Circuit descriptions 1028 may include descriptions of the circuits, or a subset of the circuits discussed above with respect to FIGS. 1-5. In particular, circuit descriptions 1028 may include circuit descriptions of: one or more communication circuits (including one or more transmitters 1030 and/or one or more receivers 1032), one or more phase-adjustment elements 1034, one or more amplifiers 1036, one or more detection circuits 1038, one or more encoders 1040, one or more decoders 1042, one or more modulators 1044, one or more links 1046, control logic 1048 (or a set of instructions), memory 1050, one or more antennas 1052, and/or one or more antenna elements 1054.

In some embodiments, system 1000 includes fewer or additional components. Moreover, two or more components can be combined into a single component, and/or a position of one or more components may be changed.

While the preceding embodiments have used electrical signals having multiple frequency components and associated phases to establish and/or determine the angle of arrival 120 (FIG. 1A), in other embodiments a variation on this technique may be used for antenna coordination in a communication system that uses a single frequency component or carrier frequency.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for determining an angle of communication between a first device and a second device, the method comprising:
at the first device,
transmitting signals through an array of antenna elements, wherein each antenna element transmits a signal that includes multiple frequency components,
wherein a given frequency component in the multiple frequency components has a phase difference with respect to a same frequency component in an adjacent antenna element, the phase difference establishing an angle of communication for the given frequency component, and
wherein the multiple frequency components within a given antenna element are transmitted with different phase differences; and
at the second device,
receiving a signal transmitted by the first device, and
determining the angle of communication between the first device and the second device based on relative strengths of the multiple frequency components in the received signal.

2. The method of claim 1, wherein the method further comprises communicating the determined angle of communication from the second device to the first device.

3. The method of claim 2, wherein after the angle of communication is communicated to the first device, the method further comprises using the angle of communication to facilitate directional communication between the first device and the second device.

4. The method of claim 1, wherein the array of antenna elements comprises a phased-arrayed antenna.

5. The method of claim 1, wherein each frequency component is associated with a respective sub-channel in a communication channel between the first device and the second device.

6. The method of claim 1, wherein a communication path between the first device and the second device is a line-of-sight communication path.

7. The method of claim 1, wherein receiving the signal at the second device includes receiving the signal at a phased-array antenna at the second device.

8. A method for facilitating determination of an angle of communication between a first device and a second device, the method comprising:
transmitting signals through an array of antenna elements at the first device, wherein each antenna element transmits a signal that includes multiple frequency components;
wherein a given frequency component in the multiple frequency components has a phase difference with respect to a same frequency component in an adjacent antenna element;
wherein the phase difference establishes an angle of communication for the given frequency component; and
wherein the multiple frequency components within a given antenna element are transmitted with different phase differences.

9. A method for facilitating determination of an angle of communication between a first device and a second device, the method comprising:
receiving a signal transmitted by the first device, the signal comprising multiple frequency components, each frequency component having been transmitted with a different angle of communication; and
determining the angle of communication between the first device and the second device based on relative strengths of the multiple frequency components in the received signal.

10. A system that determines an angle of communication, comprising:
a first device including an array of antenna elements,
wherein the first device is configured to transmit signals through the array of antenna elements, so that each antenna element transmits a signal that includes multiple frequency components,
wherein a given frequency component in the multiple frequency components has a phase difference with respect to a same frequency component in an adjacent antenna element, the phase difference establishing an angle of communication for the given frequency component, and
wherein the multiple frequency components within a given antenna element are transmitted with different phase differences; and
a second device including an antenna, wherein the second device is configured to
receive a signal transmitted by the first device through the antenna, and
determine the angle of communication between the first device and the second device based on relative strengths of the multiple frequency components in the received signal.

11. The system of claim 10, wherein the second device is configured to communicate the determined angle of communication to the first device.

12. The system of claim 11, wherein after the angle of communication is communicated to the first device, the first device and the second device are configured to use the angle of communication to facilitate directional communication between the first device and the second device.

13. The system of claim 10, wherein the array of antenna elements comprises a phased-arrayed antenna.

14. The system of claim 10, wherein each frequency component is associated with a sub-channel in a communication channel between the first device and the second device.

15. The system of claim 10, wherein a communication path between the first device and the second device is a line-of-sight communication path.

16. The system of claim 10, wherein the antenna at the second device includes a phased-array antenna.

17. A system that facilitates determining an angle of communication, the comprising:
a first device including an array of antenna elements;
wherein the first device is configured to transmit signals through the array of antenna elements, so that each antenna element transmits a signal that includes multiple frequency components;
wherein a given frequency component in the multiple frequency components has a phase difference with respect to a same frequency component in an adjacent antenna element, the phase difference establishing an angle of communication for the given frequency component, and
wherein the multiple frequency components within a given antenna element are transmitted with different phase differences.

18. The system of claim 17, wherein the first device is configured to receive a communication containing the angle of communication from the second device.

19. The system of claim 18, wherein the first device and the second device are configured to use the angle of communication to facilitate directional communication between the first device and the second device.

20. The system of claim 17, wherein the array of antenna elements comprises a phased-arrayed antenna.

21. A system that facilitates determining an angle of communication between a first device and a second device, the system comprising:
- a second device including an antenna;
- wherein the second device is configured to,
    - receive a signal transmitted by the first device through the antenna, the signal comprising multiple frequency components, each frequency component having been transmitted with a different angle of communication, and
    - determine the angle of communication between the first device and the second device based on relative strengths of the multiple frequency components in the received signal.

22. The system of claim 21, wherein the second device is further configured to communicate the determined angle of communication to the first device.

23. The system of claim 22, wherein after the angle of communication is communicated to the first device, the first device and the second device are configured to use the angle of communication to facilitate directional communication between the first device and the second device.

24. The system of claim 21, wherein the antenna at the second device includes a phased-array antenna.

* * * * *